United States Patent [19]
Currie et al.

[11] Patent Number: 5,916,660
[45] Date of Patent: Jun. 29, 1999

[54] ELONGATE BARRIER

[75] Inventors: Thomas D Currie, Bundanoon; Miroslav Barina, Graystaines, both of Australia

[73] Assignee: Schlegel Pty Limited, New South Wales, Australia

[21] Appl. No.: 08/569,246
[22] PCT Filed: Jun. 23, 1994
[86] PCT No.: PCT/AU94/00344
  § 371 Date: Dec. 22, 1995
  § 102(e) Date: Dec. 22, 1995
[87] PCT Pub. No.: WO95/00736
  PCT Pub. Date: Jan. 5, 1995

[30] Foreign Application Priority Data

Jun. 23, 1993 [AU] Australia ............................... PL9543

[51] Int. Cl.$^6$ ................................................. B60R 13/06
[52] U.S. Cl. ......................................... 428/122; 428/358
[58] Field of Search .................... 428/122, 358, 428/85

[56] References Cited

U.S. PATENT DOCUMENTS

| 206,361 | 7/1878 | Smith ...................................... 428/11 X |
| 2,063,611 | 12/1936 | MacLeod .............................. 428/31 X |
| 2,242,438 | 5/1941 | Rydquist ............................. 428/122 X |
| 4,148,953 | 4/1979 | Horton ....................................... 428/85 |
| 4,517,233 | 5/1985 | Weichman ......................... 428/122 X |
| 4,964,187 | 10/1990 | Dell'Orto ............................. 428/85 X |

FOREIGN PATENT DOCUMENTS

| 5897/54 | 4/1956 | Australia . |
| 7787/61 | 5/1963 | Australia . |
| 47982/64 | 2/1966 | Australia . |
| 8692/66 | 12/1968 | Australia . |
| 45463/68 | 5/1970 | Australia . |
| 43729/72 | 5/1973 | Australia . |
| 55051/73 | 11/1974 | Australia . |
| 78006/75 | 8/1976 | Australia . |
| 78133/75 | 12/1976 | Australia . |
| 58821/80 | 12/1980 | Australia . |
| 19167/84 | 3/1984 | Australia . |
| 24034/84 | 7/1987 | Australia . |
| 1178894 | 5/1959 | France . |
| 1555134 | 7/1970 | Germany . |
| 1555062 | 8/1970 | Germany . |
| 1956004 | 5/1971 | Germany . |
| 2162048 | 10/1972 | Germany . |
| 635443 | 4/1950 | United Kingdom . |
| 667945 | 3/1952 | United Kingdom . |
| 1407412 | 9/1975 | United Kingdom . |

Primary Examiner—Henry F Epstein
Attorney, Agent, or Firm—Ladas & Parry

[57] ABSTRACT

An elongate barrier (1) including an elongate carrier (3) which is flexible in all directions along its length and capable of retaining in transverse section substantially a U-shape (15) having a base and opposite clamping members; and at least one resilient barrier member (17) extending along the length of the carrier and having a base portion (25) and a body portion (27), wherein the base portion of the barrier member is retained in the base of the carrier by the clamping members and the body portion projects from the carrier such that when the carrier is flexed, the barrier member is retained in the carrier.

19 Claims, 2 Drawing Sheets

ELONGATE BARRIER

FIELD OF THE INVENTION

The present invention relates to barriers and seals, in particular flexible barriers and a method for making flexible barriers. It will be convenient to describe the invention with particular reference to brush type barriers, however, it will be appreciated that the invention has wider application.

BACKGROUND AND PRIOR ART

Elongate brush barriers are well known and are utilised in a wide variety of commercial, domestic and industrial applications. Elongate brushes are used extensively as draft seals around doorways and windows, light seals around doorways for dark rooms, automotive weather seals, and the like and may be used to seal out air, water, light, vermin, birds, sound, dust leaves, snow or the like. Elongate brushes are used as spray supressants around wheel arches of heavy vehicles. They are also used as sweeping or scrubbing brushes for road sweepers, car washes, food processing apparatus, cleaning brushes for conveyors and the like. They are used extensively as seals around aerobridges, scourers, spiral conveyors for fragile goods, electronic conductors, electromagnetic gasketting, just to name a few.

Conventional elongate brushes generally consist of a plurality of bristles retained in a rigid U-shaped metal channel. The bristles are generally folded about a retaining wire and a rigid steel strip is roll-formed into a U-shaped channel which clamps the bristles about a retaining wire. Whilst such rigid elongate brushes are useful for many applications, the finished product is very rigid and generally linear and it is difficult, expensive, or not possible to form into a different shape such as a circle, semi-circle, spiral or helix. Further the shape of the backing or base of the U-shape is limited to either square or rectangular, according to the dimensions of the flat steel stock used for the backing. In many applications where hygiene or corrosion resistance is important, the backing must be galvanised or stainless steel, which adds to the cost of production. When complicated brush products such as spirals, circles or the like are required, the backing often has to be welded or otherwise attached to a secondary carrier.

It would be desirable to provide for many applications an elongate brush which is flexible along its length so that the brush can be bent into any desired configuration. For example, to a helix for rotating cylinder sweepers, or conveyors, into a spiral for rotating disk sweepers, or simply being able to be directed along a guide, for example in a channel around door frames or the like where the brush is flexible enough to be fed along the guide off a spool.

There have been a number of attempts to manufacture a flexible elongate brush. One method involves the extrusion of a thermoplastic backing around the base of a line or bristles with the bases of the bristles being melded into the extruded backing using infra-red radiation or some similar heat source. Whilst the resultant elongate brush may be flexible to some extent, it suffers from a number of disadvantages. First, it is necessary for the extruded backing and bristles to be of a compatible material such that the backing will meld to and about the bristles when heated. This is acceptable when bristles made from propylene or polyethylene are used. Natural or heat sensitive bristles such as horse-hair or cotton will generally degrade at the temperatures necessary for co-extrusion with a backing. Moreover such fibres are not meldable with thermoplastic backing materials. Unless the melding of the bristles and backing is secure, bristles may readily fall away from the backing. Furthermore, it is necessary to keep the array of bristles in an orderly manner when the backing is applied. It may be necessary to keep the bristles orderly by providing sewn or woven retaining threads close to the base of the bristles which are to be melded. One other method involves the steps of knitting bristles into an orderly array, heating the bases of the bristles to melt them together along a central line, slitting the melted bristle bases to form two brushes, extruding a backing on each brush then cropping the bristle tips. Such a process, however, involves considerable work and hence adds to the cost of manufacturing such product without producing a superior product.

Whilst the problems associated with manufacture of flexible brushes have been discussed, similar problems exist in manufacture of flexible elongate "fin" type barriers such as blade wipers, squeegees or flexible blade-type seals. In such cases the problems associated with providing a flexible carrier exist, these problems being virtually identical to those faced with flexible elongate brushes.

Accordingly, there is a need to provide an elongate barrier which is flexible and which overcomes one or more of the problems of the prior art.

SUMMARY OF THE INVENTION

In accordance with the present invention there is provided an elongate barrier including an elongate carrier being flexible in all directions along its length and capable of retaining in transverse section substantially a U-shape having a base and opposite clamping members; and at least one resilient barrier member along the length of said carrier and having a base portion and a body portion, wherein the base portion of said barrier member is retained in the base of said carrier by said clamping members and said body portion projects from said carrier such that when the carrier is flexed said barrier member is retained in said carrier.

The barrier is generally elongate and may be of any suitable length. The barrier may act passively to prevent or inhibit passage of air, water, such as seals against dust, dirt, light, birds, vermin, leaves, snow or the like. In another embodiment the barrier may be active in performing a sweeping or cleaning action such as a wiper or brush.

The barrier may act to selectively allow some things past such as air, but at the same time preventing another thing past such as water. The uses of such barriers will be well known in the art.

The elongate barrier includes an elongate carrier. The carrier is flexible along its length in all directions i.e. up and down, side to side and also may be twisted along its length. In other words the elongate carrier generally has an axis running along the length of the barrier and the carrier is flexible in two dimensions along said axis and may also be twisted about its axis. Across its width, i.e. perpendicular to the axis the carrier is capable of retaining in transverse section substantially a U-shape or variation thereof such as a C-shape, which has a base and opposite clamping members. Preferably, said carrier is deformable into a selected shape in transverse section and the carrier retains that selected shape after such deformation. Preferably, the selected shape is a U-shape or C-shape in transverse section. Preferably, the carrier consists of one or more flexible longitudinal members which run along the length of the carrier and one or more transverse members which run across the width of the carrier, the transverse members being deformable into a desired shape and retaining that shape once so deformed. The longitudinal member or members are primarily to maintain the transverse members in an orderly manner or to hold the transverse members in a spaced relationship to one another. The transverse members may consist of a plurality of wire segments oriented across the width of the carrier. The carrier may consist of a substantially flat metal strip which has portions stamped or otherwise cut out so that the strip is flexible in all directions along its length and has a plurality of fingers projecting therefrom which form the clamping members. Preferably the transverse member consists of a continuous length of wire bent or otherwise formed into a sinuate shape which extends along the length of the carrier and zigzags across the width of said carrier. The wire is preferably a bright low carbon steel wire.

An essential feature of the carrier is its resistance to splay or capability of retaining the desired U-shape. This feature may be controlled by three factors being wire diameter, wire ultimate tensile strength and frequency or number of zigzags or "picks" of wire over a given length of carrier. A pick corresponds to one transverse member. It is possible to achieve increased shape retention by increasing the tensile strength of the wire and/or diameter. Preferably the resistance of the carrier to splay once in the desired U-shape is greater than about 50 Newtons, more preferably greater than about 100 Newtons.

Table A below gives a general indication of shape retention or resistance to splay when the variables above are tested:

TABLE A

| DIAMETER OF WIRE (MILLIMETERS) | TENSILE STRENGTH (HECTOBARS) | PICKS PER METER (PPM) | RESISTANCE TO SPLAY (NEWTONS) |
| --- | --- | --- | --- |
| 0.75 | 85–100 | 394–413 | 120 |
| 0.67 | 147–170 | 275.5–295 | 112 |
| 0.67 | 147–170 | 315–334.5 | 119 |
| 0.67 | 147–170 | 354–374 | 130 |

In this embodiment, the longitudinal member(s) consist of one or more strands which may be interwoven, knitted or otherwise cooperating with the transverse member to retain said wire in a sinuate shape and to maintain a spaced relation between adjacent portions of the transverse member.

In one embodiment the longitudinal members and transverse members may be fully or partially enveloped in a flexible substrate. The flexible substrate may be any suitable plastic or textile material including but not restricted to polypropylene, polyethylene, natural or synthetic rubber, T.P.E. Preferably the flexible substrate is a thermoformable polymer which can be co-extruded with and may fully encapsulate the carrier or the longitudinal and transverse members. Similarly, if the carrier consists of a substantially flat metal strip it may be fully or partially encapsulated in the flexible substrate.

If the longitudinal and transverse members are so fully encapsulated they may be protected from corrosion by the flexible substrate.

The opposite clamping members may further include gripping means adapted to compressively engage the base of the barrier to hold same in the base of the carrier. Preferably the gripping means consists of at least one fin on each clamping member which projects inwardly of the carrier and towards its base, and which extends along the carrier. The fins form a close fitting engagement with the base of the barrier and may grip the barrier as a result of compressive force exerted by the clamping members. The gripping means may be formed integrally with the flexible substrate. More than one fin may be provided on each clamping member. Other gripping means such as studs, fingers, ribs or the like may be used in addition to or in substitution of fins.

In one embodiment, one or more of the longitudinal members may be heat meltable such that when the flexible substrate is co-extruded with the longitudinal and transverse members, the heat meltable longitudinal members melt into and form part of the substrate.

The flexible substrate may further include a backing profile in any selected shape. The backing profile may be integral with the flexible substrate or it may be a separate element or elements connected to the flexible substrate. The backing profile may assist in joining or attaching the flexible barrier in its desired application. For example, the backing profile may be an elongate projection running along the length of the barrier, for example, "T"-shaped in cross-section to enable the barrier to be fed along a corresponding channel in the object to which the barrier is to be attached. A wide variety of backing profiles may be utilized.

In another embodiment, the carrier may include a leg extending away from the U-shaped portion of the carrier and adapted to facilitate connection of the barrier to an object. The leg may be a lateral extension of the carrier and the transverse members may extend into the leg such that the leg may be formed into a desired shape suitable for affixing to an object such as a truck wheel arch, door surround or the like. Depending upon the properties required of the leg for connection with an object, the transverse member may extend part or all the way into the leg. The leg may be formed into a desired shape or arrangement during the process whereby the carrier is formed into the U-shaped profile. The leg may be affixed to the desired object by any suitable means such as rivetting, hook and loop or Velcro (Registered Trade Mark) type fastners, or the like, are as are known in the art. Alternatively, the leg may be formed into a U-shaped clamping member which retentively grips the object to which it is affixed in a similar manner which the carrier grips the barrier member. For example, the leg may retentively grip a flange in the wheel arch of a vehicle. In this embodiment similar considerations of resistance to splay are relevant as discussed herein with reference to Table A.

The flexible substrate may be of any suitable colour or texture. The substrate may be of a particular colour to indicate the characteristics of the barrier, such as the type of brush or barrier fin, the strength or application of the barrier or the like.

The resilient barrier member may be any suitable barrier known in the art. The barrier may be an elongate resilient web or fin which extends along the axis of the carrier. Such a fin may be made from a resilient material such as rubber or a web of polyethylene film or the like. The fin may act as a wiper in the same manner as an automotive windscreen wiper, or even as a squeegee.

Preferably, the barrier member is in the form of a brush consisting of a plurality of bristles which extend substantially perpendicular to the axis of the barrier. The bristles may be made from any suitable bristle material which is known in the brush making art. The bristles may be made from, for example, nylon, carbon fibre, horse-hair, cotton, polypropylene, polyethylene or the like and may be in any length, shape, form, stiffness, colour or thickness. The brush may consist of a blend of two or more different types of bristle. The brush may consist of a blend of electrically conductive and non-conductive bristles. The particular application for which the barrier is intended will dictate the type of bristle which should be utilised. The skilled addressee will readily appreciate the suitability of a particular type of bristle for a specific application.

In one embodiment, the flexible substrate encapsulating the carrier may be melted into or otherwise additionally bonded to the barrier material.

According to another aspect of the invention there is provided a method for making an elongate barrier comprising:

(a) providing an elongate carrier which is flexible in all directions transverse to its length and being deformable across its width into a selected shape, said carrier retaining said selected shape after such deformation;

(b) providing a resilient barrier member having a base portion and a body;

(c) positioning the base portion of said barrier member about said carrier; and (d) deforming said carrier such that the carrier retentively grips the base portion of said barrier member.

Preferably where the barrier member is a brush, a plurality of bristles are positioned about said carrier and the carrier is then deformed to grip part of the bristles. The bristles may be positioned perpendicular to the axis of the carrier, and the carrier deformed into a "U" or "C" shape in transverse section having a base and opposite clamping members which retentively grip that portion of the bristles which were positioned about the carrier. The carrier may be partially preformed into a "U" or "C" shape, but preferably it has a substantially flat upper surface which forms the base and clamping members once the carrier is deformed into the "U" or "C" shape. Surprisingly, conventional elongate brush-making machinery may be utilized to form the elongate barrier of the present invention. In such machinery, the bristles may be assembled in a magazine and passed onto the carrier member in a similar fashion to that used for conventional rigid backed elongate brushes.

The barrier may include a retaining member which is positioned on top of the base portion of the bristles before the carrier is deformed. In a preferred embodiment, the base portion of the bristles are compressed securely between the opposite clamping members of the carrier and the retaining member. The opposite clamping members of the carrier are crimped around the retaining member so that the bristles are held securely therebetween. The retaining member may be any suitable size or shape and preferably runs substantially along the length of the barrier. The retaining member may be a wire. The wire may be made from any suitable metal such as stainless steel, mild steel, aluminium, copper or the like. Preferably the wire is a low carbon steel wire. The wire may be coated with any suitable material such as a polymeric material. This is advantageous if the retaining member needs to be protected from corrosion. Alternatively, the retaining member may be an extruded polymeric material of any desired shape. In order to facilitate flexibility of the barrier, the retaining member should also be flexible along the length of the barrier.

In another embodiment, there may be provided a secondary barrier member which runs along the length of the barrier. Preferably, when the primary barrier consists of a plurality of bristles, the secondary barrier consists of an elongate flexible fin which runs parallel to the array of bristles. The secondary barrier may consist of an elongate web which may be incorporated into the barrier in the same manner as the bristles, i.e. by laying the secondary barrier along the length of the carrier beneath the retaining member (where provided) and either on top of or beneath the bristles. When the barrier is formed, the secondary barrier member may be folded about the retaining member and retained in the base of the carrier in the same manner as the bristles. Alternatively, the retaining member may be provided with a portion extending perpendicular to the axis of the retaining member. The extending portion may be a rib or fin which runs along the length of the retaining member or it may be a plurality of bristle-like or short fin projections.

BRIEF DESCRIPTION OF THE DRAWINGS

It will now be convenient to describe the invention with reference to the accompanying drawings. It is to be understood that the drawings and the following description relate to a preferred embodiment only and are not intended to limit the scope of the present invention.

DETAILED DESCRIPTION OF PREFERRED EMBODIMENTS

Figure 1:
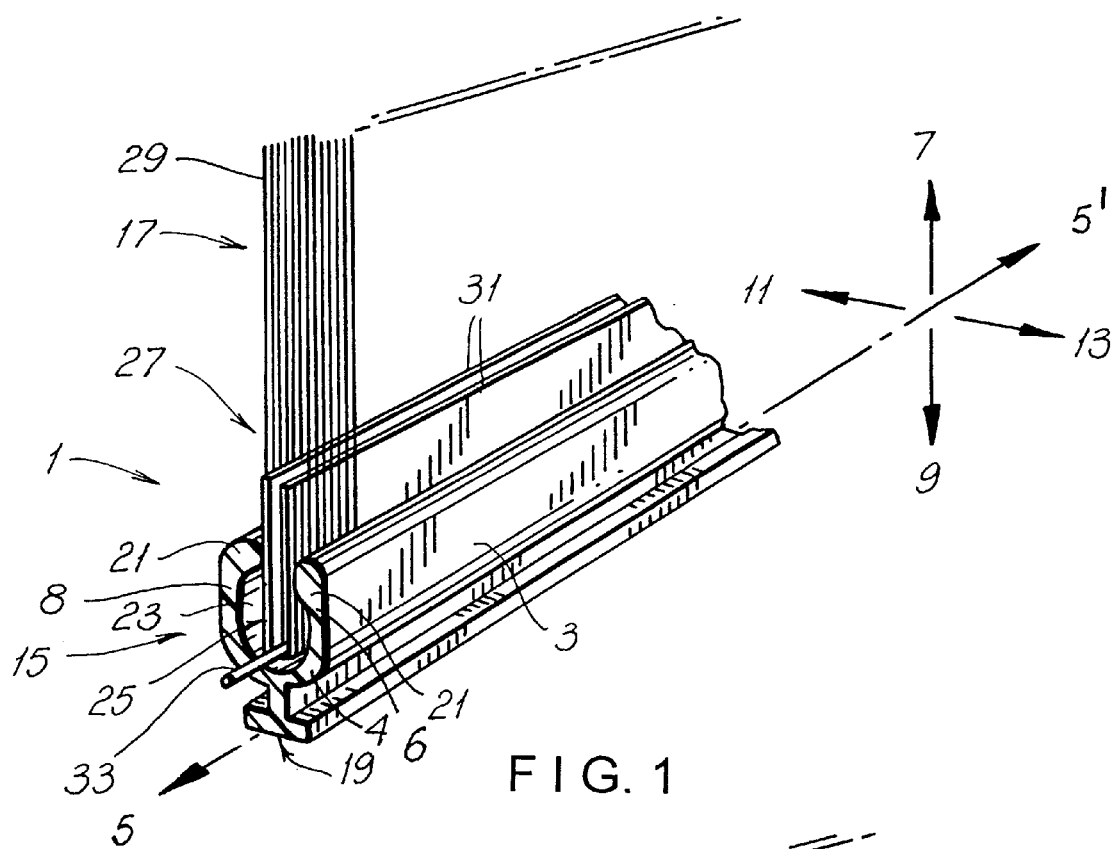
FIG. 1 is a perspective view of a portion of an elongate barrier made in accordance with the present invention.

Elongate barrier 1 includes an elongate carrier 3. Elongate carrier 3 has an axis generally along the line shown 5,5'. The carrier 3 is flexible in all directions along the axis 5,5', both up and down as represented by arrows 7 and 9 and side to side represented as arrows 11 and 13. Carrier 3 may also be twisted about axis 5,5'. The elongate carrier 3 may be flexible substantially along the full length of the axis 5,5' although portions of the carrier 3 may be rigid in one or more directions along the axis 5,5'. Perpendicular to the axis 5,5' the carrier 3 is capable of retaining a selected shape. In FIG. 1, the selected shape in transverse section is substantially a U-shaped profile 15 although other shapes may equally be adopted such as a "C" profile. The selected shape must be such that resilient barrier member 17 is retentively gripped by the carrier 3 when the carrier 3 is deformed into the selected shape.

Carrier 3 has a base portion 4 and opposite clamping members 6 and 8. Carrier 3 may include a backing profile member 19 which is adapted to enable barrier 1 to be easily attached in situ where the barrier is required.

Figure 4:
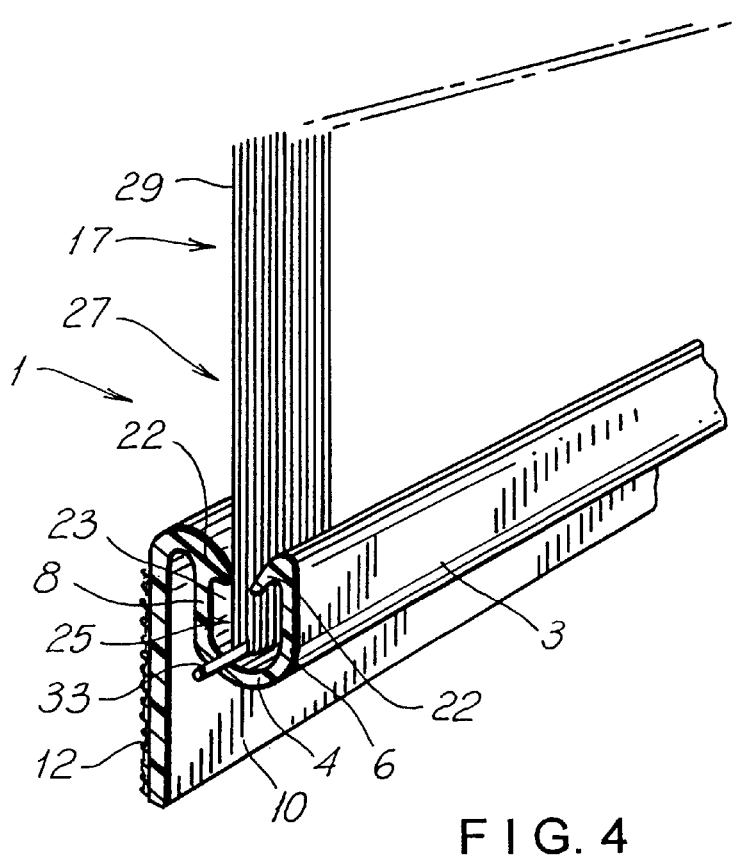
FIG. 4 is a perspective view of a portion of an elongate barrier made in accordance with another embodiment of the present invention.

In FIG. 4 carrier 3 includes a leg 10 which extends away from U-shaped profile 15. Leg 10 may include a fastening means 12 such as Velcro (Registered Trade Mark) or the like to facilitate affixing to an object.

Carrier 3 may also include gripping means shown in FIG. 1 as lugs 21 on the inside walls 23 of carrier 3. Lugs 21 may act to assist in clamping barrier member 17 within the U-shaped profile 15. Any other suitable means may be provided on the inside walls 23 to assist in firmly holding barrier member 17. Such means may include ribs, studs, fins, or the like. In FIG. 4, gripping means are inwardly projecting ribs 22 on clamping members 6 and 8.

Barrier member 17 has a base portion 25 and a body 27. In FIG. 1 barrier member 17 consists of a primary barrier member consisting of a plurality of bristles 29 and a secondary barrier member consisting of an elongate fin 31. The base portion 25 of bristles 29 and fin 31 are located within the U-shaped profile 15. The body 27 of bristles 29 and fin 31 extend beyond carrier 3.

In FIG. 4, barrier member 17 consists of a plurality of bristles 29.

Retaining member 33 is located within the U-shaped profile 15, and the base portion 25 of bristles 29 and fin 31 are folded about retaining member 33. The clamping action of the U-shaped profile around retaining member 33 and against barrier member 17 holds the base portion 25 of barrier member 17 within carrier 3.

Figure 2:
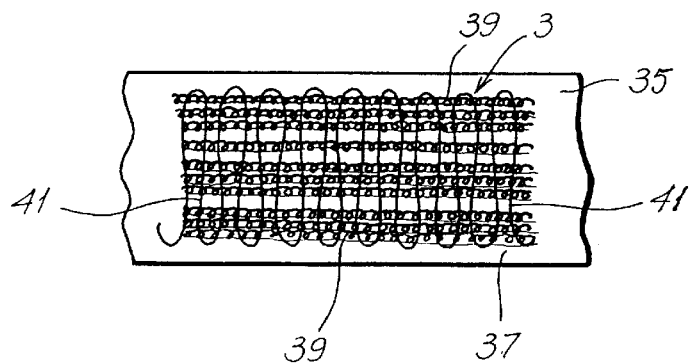
FIG. 2 is a cut away plan view of a portion of an elongate carrier of the present invention.

In FIG. 2, carrier 3 is shown to consist of a flexible substrate 35 in which there is embedded a continuous wire 37 formed into a sinuate shape which extends along the length of the carrier 3. A plurality of strands 39 are knitted in co-operation with wire 37. Wire 37 provides transverse members 41 which give carrier 3 the property of retaining the selected shape after carrier 3 is deformed. In FIG. 4 the transverse members may extend into leg 10 such that leg 10 may be formed into a desired shape.

Figure 3:
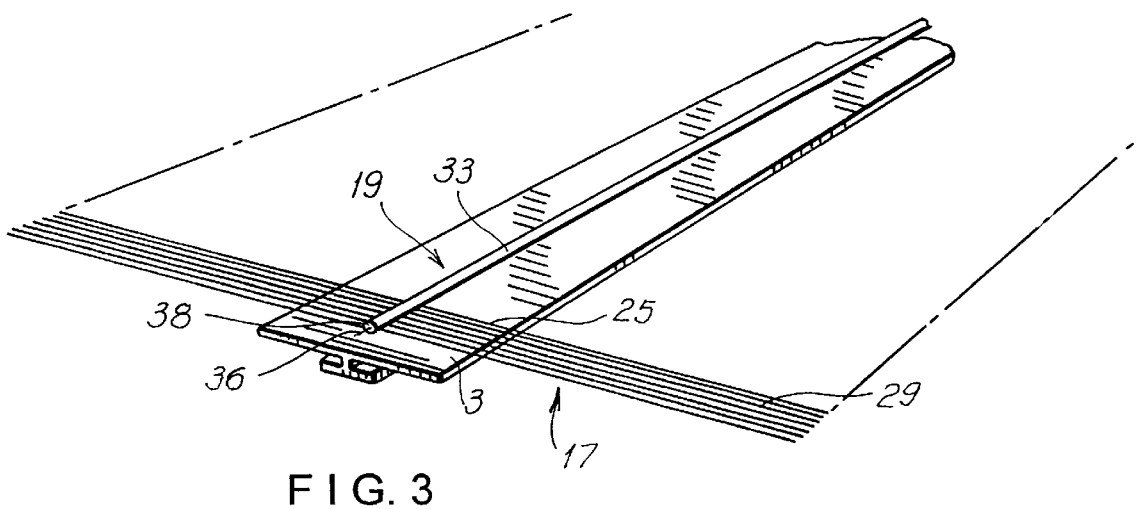
FIG. 3 is a perspective view of a portion of an elongate barrier of the present invention before forming.

FIG. 3 shows the arrangement of the carrier 3, barrier member 17 and retaining member 33 before carrier 3 is deformed. Retaining member 33 is shown as a wire 36 with a coating 38. Carrier 3 has an upper surface 19 which, when carrier 3 is deformed, forms inside walls 23 as shown in FIG. 1. Bristles 29 may be laid over upper surface 19 such that the base portion 25 of bristles 29 overlies upper surface 19. Retaining member 33 may then be positioned over the base portion 25 of bristles 29. To form the barrier, carrier 3, bristles 29 and retaining member 33 are simultaneously passed through machinery which deforms clamping members 6 and 8 around retaining member 33 and lugs 21 or ribs 22 abut against bristles 29 such that the base portion 25 of the bristles are retained by the carrier 3. This forming method can be done as a continuous procedure. Conventional elongate brush making machinery may be utilized with minor modifications to account for the dimensions of the carrier. After formation of the elongate brush, the bristles may be cropped such that the bristles are all of equal length.

It is to be understood that various modifications, additions, and/or alterations may be made to the parts previously described without departing from the ambit of the present invention.

What is claimed is:

1. An elongate barrier comprising an elongate carrier which is flexible in all directions along its length and which is capable of retaining in transverse section substantially a U-shape, said carrier including a longitudinal member, and a transverse member extending transversely of said longitudinal member, said transverse member being deformable such that said carrier is deformed to said U-shape in which said carrier has a base and opposite clamping members; and at least one resilient barrier member extending along the length of said carrier having a base portion and a body portion, wherein the carrier is deformable into said U-shape around the base portion of said barrier member and said clamping members retain the base portion of the barrier member in the base of the carrier, such that when the carrier is flexed, the barrier member is retained in said carrier.

2. An elongate barrier according to claim 1, wherein said longitudinal member consists of an elongate flexible strip and said transverse member consists of a plurality of fingers projecting laterally from said longitudinal member.

3. An elongate barrier according to claim 1, wherein said transverse member consists of a continuous sinuate wire extending along the length of said carrier and zigzagging across the width of said carrier and wherein said longitudinal member consists of one or more strands co-operating with said wire to retain said wire in said sinuate shape.

4. An elongate barrier according to claim 1, wherein said carrier further includes a flexible substrate enveloping substantially all of said base and said clamping members.

5. An elongate barrier according to claim 4, wherein said carrier further includes gripping means on said clamping members for compressively engaging said barrier member to hold the barrier member in the base of said carrier.

6. An elongate barrier according to claim 5, wherein said gripping means is integral with said flexible substrate.

7. An elongate barrier according to claim 5, wherein said gripping means comprises a rib extending along the length of each clamping member and projecting inwardly towards the opposite clamping member.

8. An elongate barrier according to claim 1, wherein said carrier further includes a connection member for connecting said barrier to a desired site.

9. An elongate barrier according to claim 8, wherein said connection member comprises a leg projecting from said carrier to retentively engage the desired site.

10. An elongate barrier according to claim 8, wherein said connection member includes one of a pair of hook and loop fasteners, the other of the fasteners being attached to the desired site.

11. An elongate barrier according to claim 1, wherein said barrier member comprises a plurality of bristles collectively forming a base portion retained in said carrier.

12. An elongate barrier according to claim 11, wherein the base portion of said bristles passes around a retaining member disposed in the base of said carrier and said retaining member is held in the base of said carrier by said clamping members.

13. An elongate barrier according to claim 12, wherein said retaining member comprises a flexible wire extending along the length of said carrier.

14. An elongate barrier according to claim 1, wherein the carrier has a resistance to splaying which is greater than about 50 Newtons.

15. An elongate barrier according to claim 1, wherein the carrier has a resistance to splaying which is greater than about 100 Newtons.

16. An elongate barrier comprising an elongate carrier including a substrate of flexible plastic material and longitudinal and transverse members embedded in said substrate, said substrate of said carrier being flexible in all directions along its length and being bendable to a U-shape which the carrier retains due to the longitudinal and transverse members embedded in said substrate, said carrier forming, when in said U-shape, a base and opposite legs extending from said base constituting clamping members, and at least one resilient barrier member extending along the length of said carrier and transversely therebeyond, such that when the carrier is bent to said U-shape, said barrier member is bent therewith and is retained by said clamping members of said carrier.

17. An elongate barrier according to claim 16, wherein said transverse member forms a sinuate wire which is interknitted with said longitudinal member.

18. An elongate barrier according to claim 16, further comprising a retaining wire extending along the length of said carrier and superimposed on said barrier member so that when the carrier is bent to U-shape said barrier member is bent around said retaining member.

19. An elongate barrier according to claim 16, comprising a connecting member extending from said carrier and including means for attachment to an external site.

* * * * *